H. TULLER.
Bee Hive.
No. 78,621. Patented June 2, 1868.
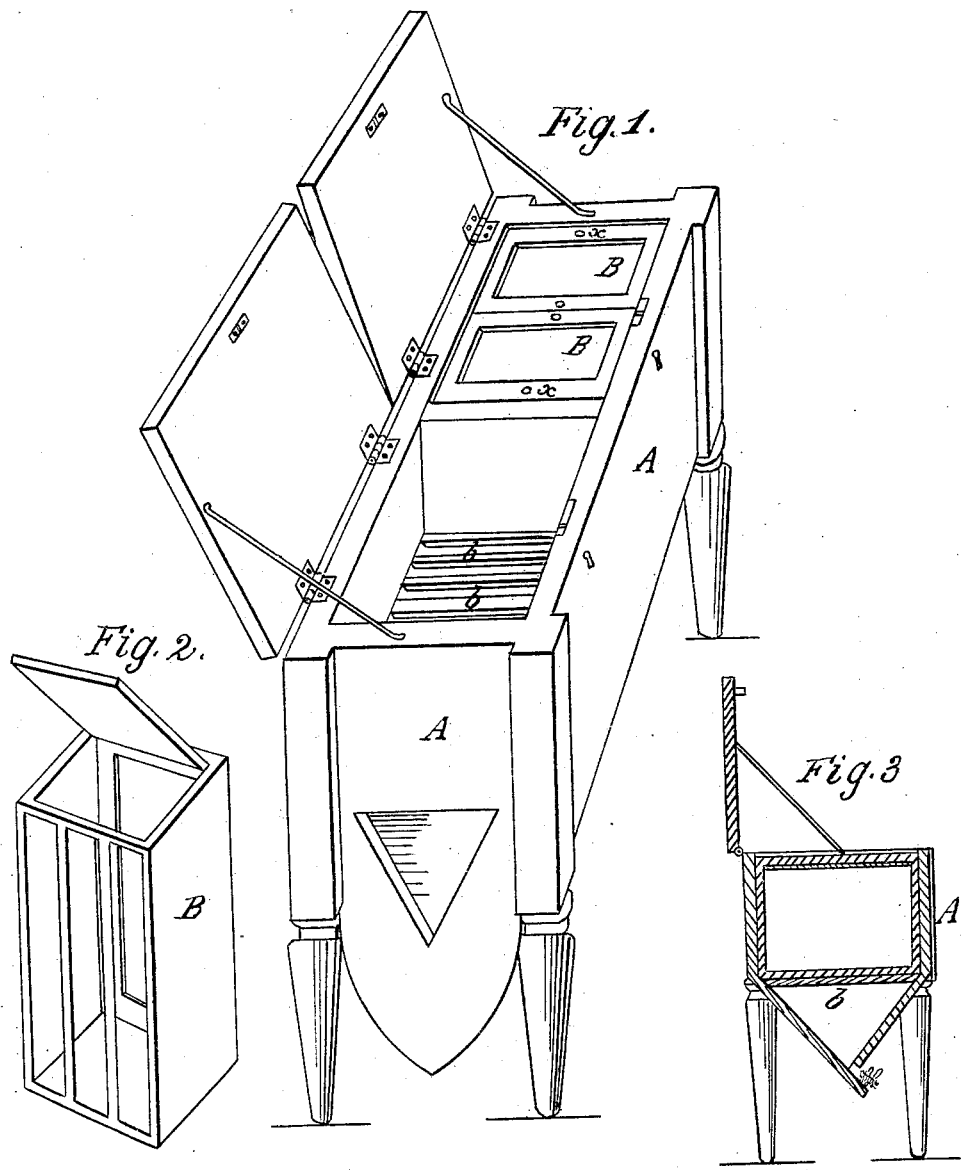

United States Patent Office.

HOMER TULLER, OF ASH GROVE, ILLINOIS.

Letters Patent No. 78,621, dated June 2, 1868.

IMPROVEMENT IN BEE-HIVES.

*The Schedule referred to in these Letters Patent and making part of the same.*

TO ALL WHOM IT MAY CONCERN:

Be it known that I, HOMER TULLER, of Ash Grove, in the county of Iroquois, and in the State of Illinois, have invented certain new and useful Improvements in Bee-Hives; and do hereby declare that the following is a full, clear, and exact description thereof, reference being had to the accompanying drawings, and the letters of reference marked thereon. In the annexed drawings, making a part of this specification—

Figure 1 represents a perspective of my hive, with the boxes taken out of one end or compartment.

Figure 2 represents a perspective of one of the boxes, and

Figure 3 represents a cross-section of the hive or house.

A represents a rectangular box or hive, of any desired dimensions, provided with suitable legs. The bottom of the hive A is composed of two boards, placed at any angle desired, one underlapping the other, and leaving a space between them for the bees to pass into the hive, as shown in fig. 3. A series of horizontal slats, $b$, is placed crosswise of and near the bottom of the hive A, where the two boards are joined thereto, at an angle therewith and with each other. These slats $b$ are for the purpose of giving a suitable rest or support for the honey-boxes B, and to allow free access of the bees to said boxes. The ends of the hive A are made of such shape as to correspond with the sides and angular bottom boards, and have glass set in them so as to give light in the chamber between the cross-slats $b$ and the bottom boards where the bees enter. The hive is also provided with hinged covers on its top, which may be locked to prevent robbery or disturbance of the bees.

B represents a honey-box, its top being composed of glass and bottom of a series of slats, corresponding with the cross-slats $b$ of the hive, and having one of its ends hinged, so that the honey therein may be taken out without breaking the comb, and that it may be convenient as a swarming-hive. The boxes B are provided with loops or rings $x$, as convenient handles to lift them out of the hive. The boxes are constructed of length equal to the width of the interior of the hive, and otherwise of any desired dimensions, so that one, two, or more may be placed in the hive.

The hive or box A may be of the required length of one hive or swarm of bees, or longer, and any number of swarms may hive in the same box, by placing partitions across the same at suitable distances apart.

It will be seen that this hive is perfectly moth-proof, as they cannot crawl on the under side of the angular bottom boards, and should the eggs be deposited in the chamber between the cross-slats $b$ and the bottom boards, the first attempt to crawl would cause the moth to roll out on to the ground, from which it is impossible for it to again gain entrance to the hive.

Having thus fully described my invention, what I claim as new, and desire to secure by Letters Patent, is—

1. The box or hive A, constructed substantially as described, when used in combination with honey-boxes B, as and for the purpose specified.

2. The honey-boxes B, having the top side made of glass, and a series of slats at the bottom and one end, hinged in the manner substantially as and for the purpose set forth.

In testimony that I claim the foregoing, I have hereunto set my hand, this 7th day of December, 1867.

HOMER TULLER.

Witnesses:
C. M. ALEXANDER,
J. M. MASON.